(12) United States Patent
Rios et al.

(10) Patent No.: US 10,680,910 B2
(45) Date of Patent: Jun. 9, 2020

(54) VIRTUALIZED PROACTIVE SERVICES

(71) Applicant: TELEFONAKTIEBOLAGET LM ERICSSON (PUBL), Stockholm (SE)

(72) Inventors: Ricardo Rios, Allen, TX (US); Jarkko Pasanen, Frisco, TX (US); Andrew McQuerry, Plano, TX (US); Ken Guttenfelder, Frisco, TX (US); Stephen Gilbert, Garland, TX (US); Sushil Dravekar, Plano, TX (US); Long Ye, Plano, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 251 days.

(21) Appl. No.: 15/853,621

(22) Filed: Dec. 22, 2017

(65) Prior Publication Data

US 2018/0205619 A1 Jul. 19, 2018

Related U.S. Application Data

(60) Provisional application No. 62/448,293, filed on Jan. 19, 2017.

(51) Int. Cl.
| | |
|---|---|
| *H04L 12/24* | (2006.01) |
| *H04L 12/46* | (2006.01) |
| *H04L 29/08* | (2006.01) |
| *G06F 9/455* | (2018.01) |

(52) U.S. Cl.
CPC ...... *H04L 41/5009* (2013.01); *G06F 9/45558* (2013.01); *H04L 12/4641* (2013.01); *H04L 41/0681* (2013.01); *H04L 67/10* (2013.01); *G06F 2009/45587* (2013.01); *G06F 2009/45591* (2013.01); *G06F 2009/45595* (2013.01)

(58) Field of Classification Search
CPC . H04L 41/5009; H04L 41/0681; H04L 67/10; H04L 12/4641; G06F 9/45558; G06F 2009/45591; G06F 2009/45595; G06F 2009/45587
USPC ........................................................ 709/224
See application file for complete search history.

(56) References Cited

U.S. PATENT DOCUMENTS

| | | | | |
|---|---|---|---|---|
| 2006/0059253 | A1* | 3/2006 | Goodman | G06Q 10/10 709/223 |
| 2007/0140133 | A1* | 6/2007 | Gudipalley | H04L 41/065 370/242 |
| 2011/0106942 | A1* | 5/2011 | Roskowski | H04W 24/00 709/224 |

(Continued)

*Primary Examiner* — Moustafa M Meky
*Assistant Examiner* — Elizabeth Kassa
(74) *Attorney, Agent, or Firm* — NDWE LLP

(57) ABSTRACT

A standalone and virtual proactive services (vPAS) implementation is described. The vPAS is entirely self-contained, encrypted, and can be hosted within the customer's network. Furthermore, data collected by the vPAS can be analyzed without the data leaving the customer's firewall, thereby providing additional assurance to the network operator's data security and privacy. Moreover, the solution is developed based on an architecture that enables the platform to run in a variety of computing environments, including cloud-based environments. The vPAS system addresses data security and privacy concerns, enables different budgeting options, enables in-line predictive analysis, provides flexible delivery options, and increases the performance of preemptive services.

18 Claims, 11 Drawing Sheets

(56) References Cited

U.S. PATENT DOCUMENTS

| | | | | |
|---|---|---|---|---|
| 2011/0307889 | A1* | 12/2011 | Moriki | G06F 9/45558 |
| | | | | 718/1 |
| 2016/0342906 | A1* | 11/2016 | Shaashua | H04L 67/22 |
| 2016/0366243 | A1* | 12/2016 | Chefalas | H04L 67/32 |
| 2017/0187602 | A1* | 6/2017 | Pathela | H04L 43/0852 |

* cited by examiner

VIRTUALIZED PROACTIVE SERVICES

CROSS-REFERENCE TO RELATED APPLICATIONS

This application claims the benefit of U.S. Provisional Application No. 62/448,293, filed Jan. 19, 2017, which is hereby incorporated by reference.

TECHNICAL FIELD

Embodiments of the invention relate to the field of telecom network data collection and analysis; and more specifically, to the collection and analysis of data generated by components of telecommunications services and networks.

BACKGROUND

Telecommunications services and networks are rapidly evolving in response to new types of end-user demands. For example, new types of Internet consumption patterns (e.g., high-definition streaming video, an increase in Internet of things (IoT) devices, 5th generation mobile networks (5G), etc.) are often straining existing service provider network infrastructures. Operators of such networks are under constant pressure to deliver superior network performance with limited resources. In response to these demands and others, network operators are increasingly relying on data analysis systems to analyze and detect occurrences of issues which could impact user experience. Existing applications typically rely on one or more data collection servers physically installed in a network operator's network and which send collected data to an external data analysis server hosted by another entity (e.g., physically installed in network of the data analysis system). Although the data from the network operator's network can be sent using secure network links between the network operator's network and the data analysis server, network operators might be uncomfortable with such data leaving the operator's network due to data privacy, data security, or other concerns.

SUMMARY

Systems, methods, apparatuses, computer program products, and machine-readable media are provided to implement a standalone and virtual proactive services (vPAS) system. The vPAS system is entirely self-contained, encrypted, and can be hosted within a customer's network. Furthermore, data collected by the vPAS system can be analyzed without the data leaving the customer's firewall, thereby providing additional assurance to network operators of the security and privacy of their data. Moreover, the vPAS system described herein is developed using a component based architecture (CBA) that enables the vPAS system to run in a variety of computing environments, including cloud-based environments. The benefits of the embodiments described herein include addressing network operator's data security and privacy concerns, enabling customers different budgeting options, enabling in-line predictive analysis, providing flexible delivery options, and increasing the performance of preemptive services generally.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
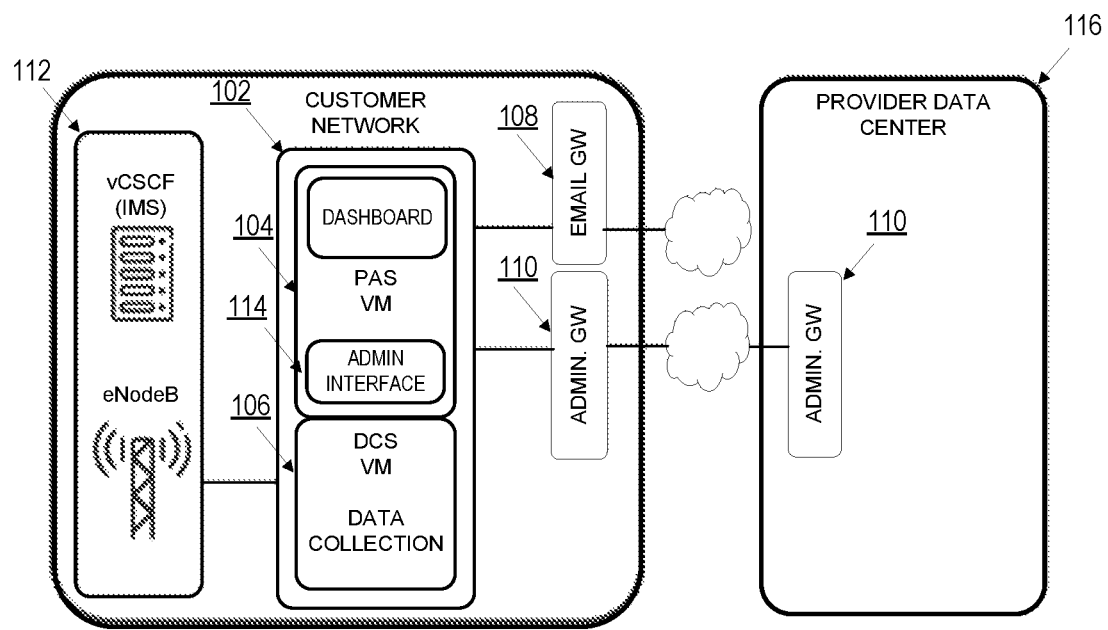
FIG. 1 is a block diagram illustrating a standalone virtual proactive services (vPAS) implementation according to some embodiments.

The following description describes methods and apparatus for a virtualized proactive service (vPAS). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

1.0 Standalone PAS Implementation Overview

Embodiments disclosed herein relate to a standalone and virtual proactive services (vPAS) system. The vPAS system described herein is entirely self-contained, encrypted, and can be hosted within a customer's network. Furthermore, data collected by the vPAS can be analyzed without the data leaving the customer's firewall, thereby providing additional assurance to network operators of the security and privacy of their data. Moreover, the vPAS system described herein is developed based on a component-based architecture (CBA) that enables the vPAS system to run in a variety of computing environments, including cloud-based environments. The benefits of this solution include access to new customer segments as well as new options for existing customers, the ability to address data security and privacy concerns, the ability to offer different budgeting options, enabling in-line predictive analysis, providing flexible delivery options, and increasing the performance of preemptive services.

In an embodiment, a standalone vPAS implementation moves PAS functionality into the customer network to address security concerns from operators. At a high level, PAS functionality includes network monitoring, capturing network behaviors, and analyzing the behaviors to preempt disturbances that would cause performance or service degradations. The vPAS system described herein is self-contained, encrypted, and hosted on a customer data center to ensure that data collection, analysis, and results stay within the customer's network. External personnel can monitor and configure a vPAS system using a secure gateway as agreed with the customer.

FIG. 1 illustrates a proposed vPAS implementation according to some embodiments. In an embodiment, the vPAS 102 comprises a PAS 104, data collection servers 106, an email gateway 108, an admin gateway 110, and target nodes 112.

In an embodiment, the PAS 104 comprises a dashboard, an administrative interface, and a database, and further includes use case analysis functions. In an embodiment, a dashboard presents use case information to a customer to give them an overview of the current alerts from the nodes (e.g., target nodes 112) being monitored. In an embodiment, an administrative interface 114 provides an interface to the customer to manage the PAS 104. External personnel can access the PAS solution for administrative purposes.

In an embodiment, the data collection servers 106 include functionality to connect to the target nodes 112 to collect node data. In an embodiment, the email gateway 108 includes an email relay server provided by the customer for the purpose of sending emails. In an embodiment, target nodes 112 (e.g. vMME, eNodeB, and other devices) comprise nodes monitored by the PAS solution for the purpose of delivering preemptive service.

2.0 CBA Architecture

Figure 2:
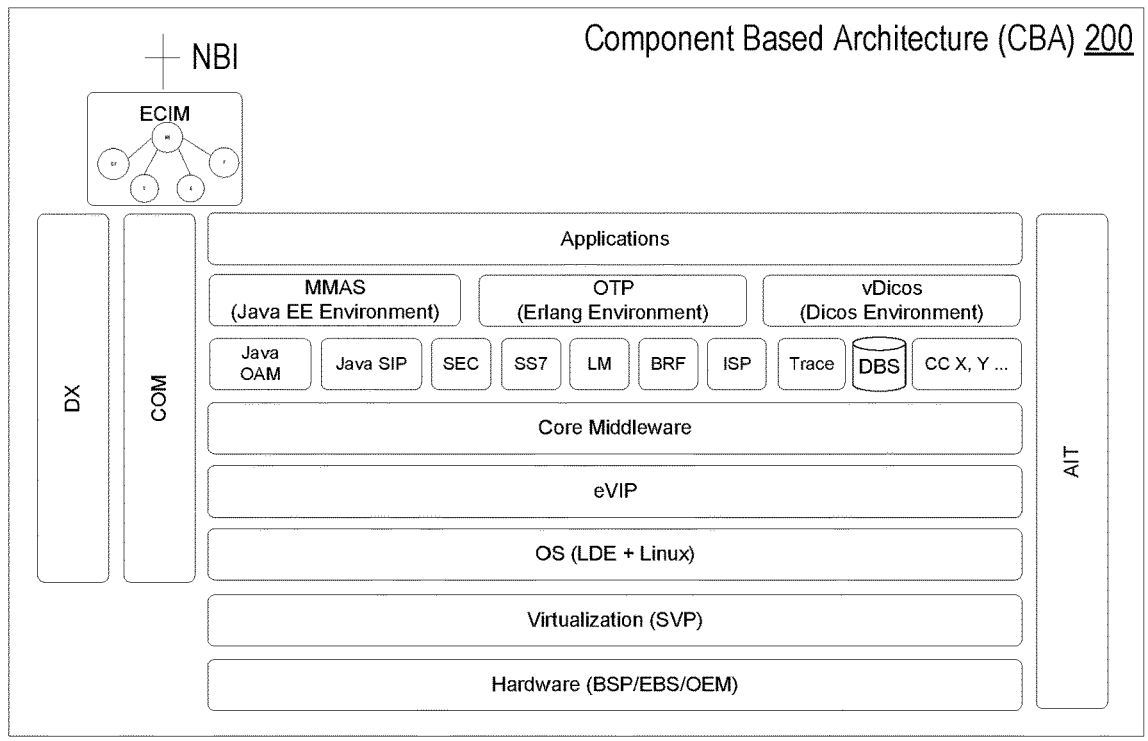
FIG. 2 is a block diagram illustrating a component based architecture (CBA) according to some embodiments.

FIG. 2 is a block diagram illustrating a component based architecture (CBA) 200 upon which a vPAS system can be based. In an embodiment, a CBA framework provides reusable software components that can be put together to provide a custom platform to suit application requirements. A CBA framework provides features including high availability, scalability, reliability, load balancing, etc.

2.1 Service Availability Framework (OpenSAF)

Figure 3:
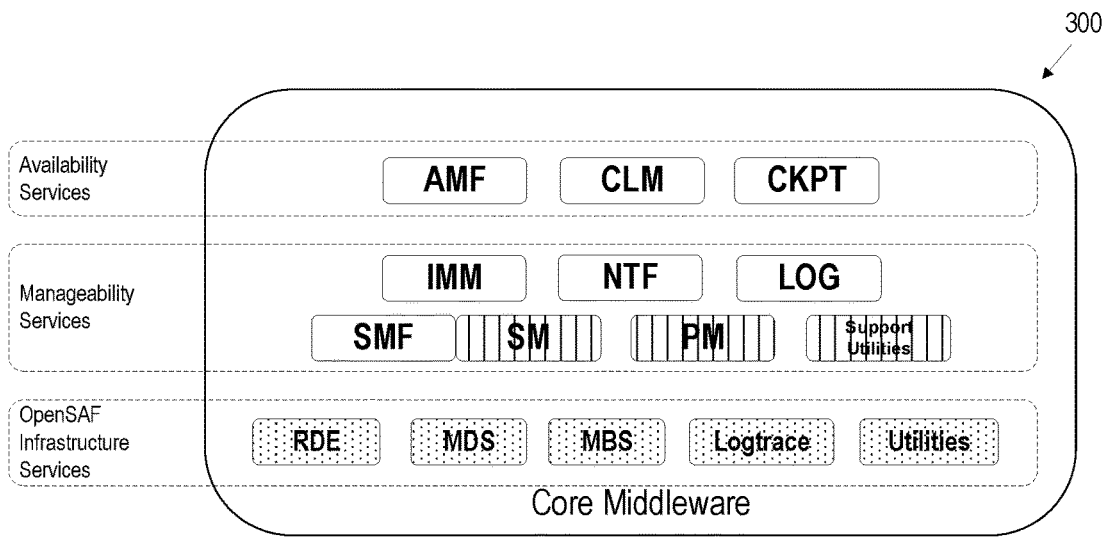
FIG. 3 is a block diagram illustrating an architecture including OpenSAF services according to some embodiments.

In an embodiment, a CBA Core Middleware (CoreMW) is based on OpenSAF standards and provides an Application Management Framework (AMF) and a Software Management Framework (SMF). FIG. 3 illustrates an architecture 300 including OpenSAF services.

2.2 CBA Based Virtualized Cluster

Figure 4:
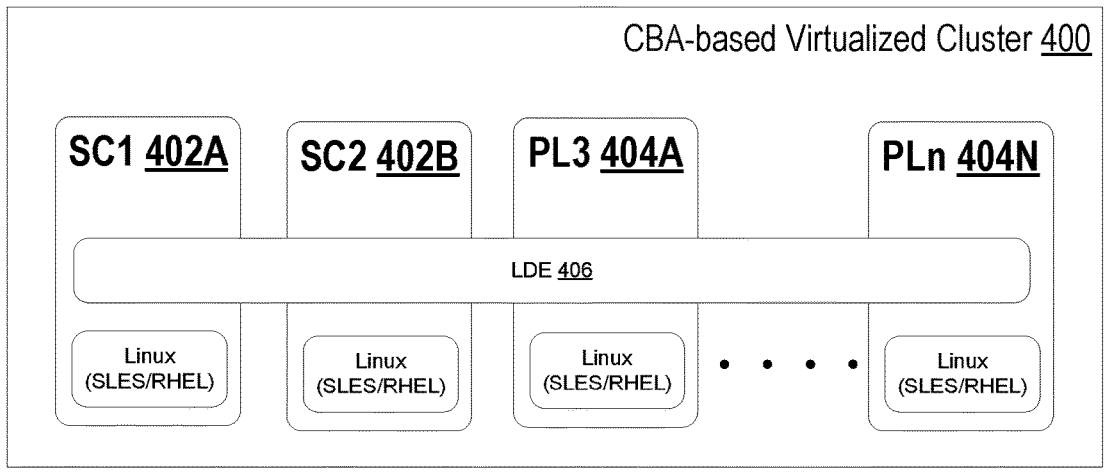
FIG. 4 is a block diagram illustrating a CBA-based virtualized cluster according to some embodiments.

FIG. 4 is a block diagram illustrating a CBA-based virtualized cluster 400. In an embodiment, a CBA virtualized cluster contains two System Controller (SC) nodes 402A, 402B running in Active-Standby mode providing high availability, reliability and maintaining integrity of the cluster. Each SC has attached storage volume and hosts a Distributed Replicated Block Device (DRBD) volume. DRBD is a software-based, shared-nothing, replicated storage solution mirroring the content of block devices between hosts. The cluster also consists of Payload (PL) nodes 404A-404N which run application software components. The DRBD volume is shared via NFS on payloads which enables cluster communication via shared files.

In an embodiment, each node runs Linux (SLES12) with Linux Distribution Extensions (LDE) 406 and Core Middleware software based on OpenSAF (Open Services Availability Framework).

2.3. Application Architecture

Figure 5A:
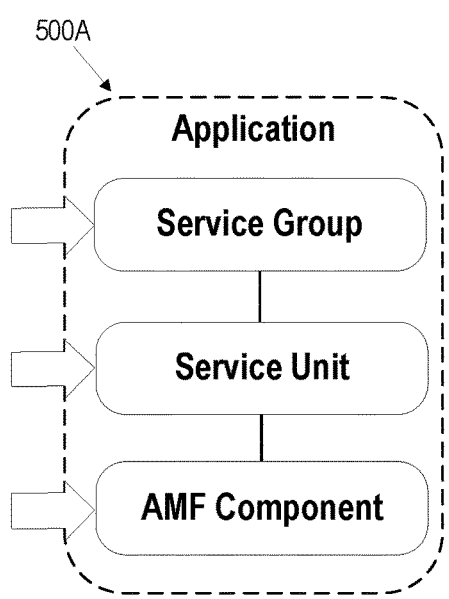
FIGS. 5A and 5B are block diagrams illustrating an application architecture and an application architecture in virtualized infrastructure according to some embodiments.
Figure 5B:
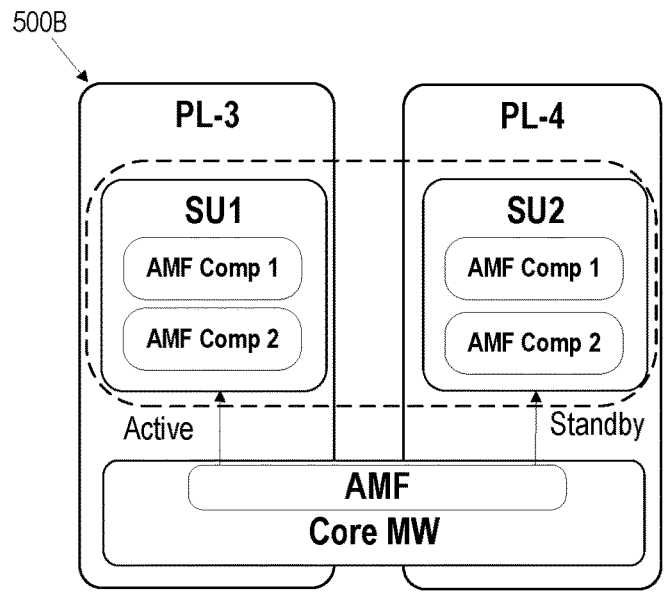

FIGS. 5A-5B are block diagrams illustrating an application architecture 500A and an application architecture 500B in virtualized infrastructure, respectively.

3.0 VPAS System Architecture

Figure 6:
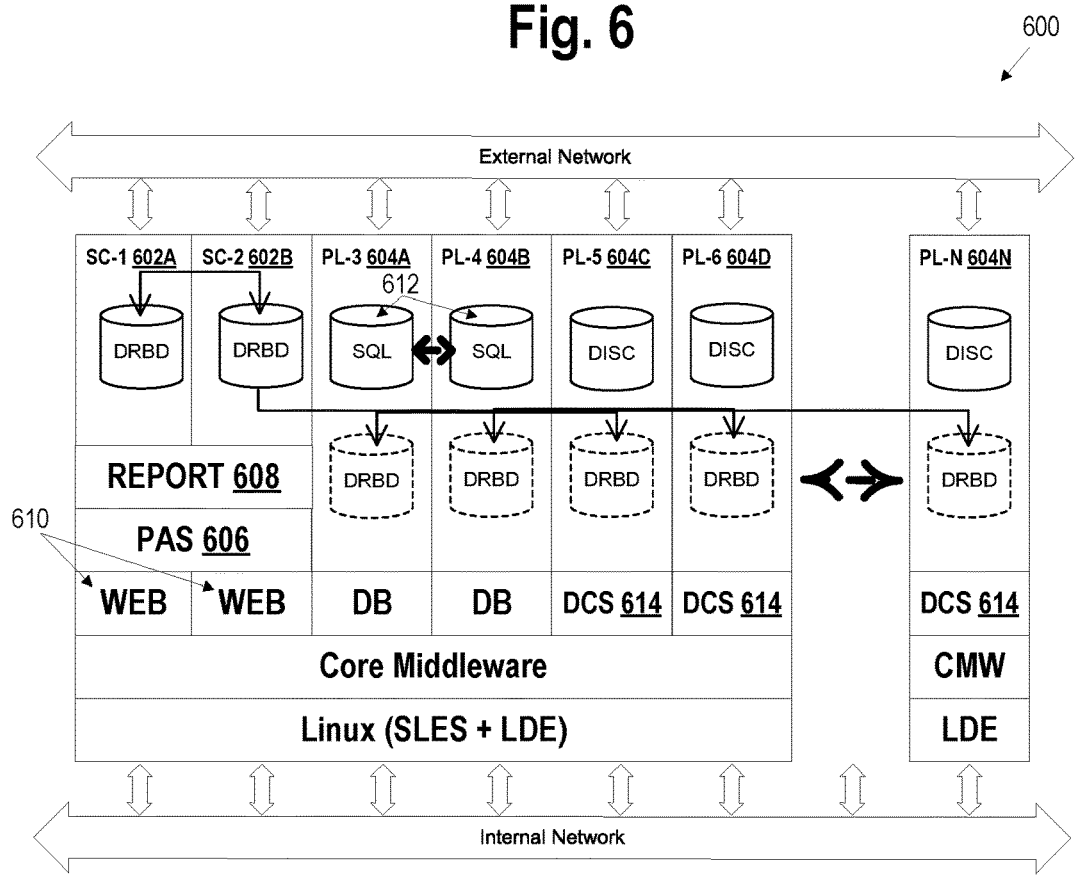
FIG. 6 is a block diagram illustrating a vPAS system architecture according to some embodiments.

FIG. 6 is a block diagram illustrating a vPAS system architecture 600. In an embodiment, a vPAS cluster follows a standard CBA virtualized cluster architecture and contains two (2) SCs 602A, 602B and several scalable Payloads 604A-604N. PAS component 606, Report 608 and Web software components 610 are hosted on the SCs to provide services in highly available configuration. First, two Payloads 604A, 604B are used to host a MYSQL database 612 in a master-slave configuration, which serves database requirements for the vPAS system. A Data Collection Servers (DCS) component 614 is hosted on two or more Payloads, as needed. Each DCS component 614 collects data from configured nodes and is controlled by a PAS component 606 running on an SC 602A, 602B. A DCS 614 collects data in the storage volumes attached to the Payload.

Figure 7:
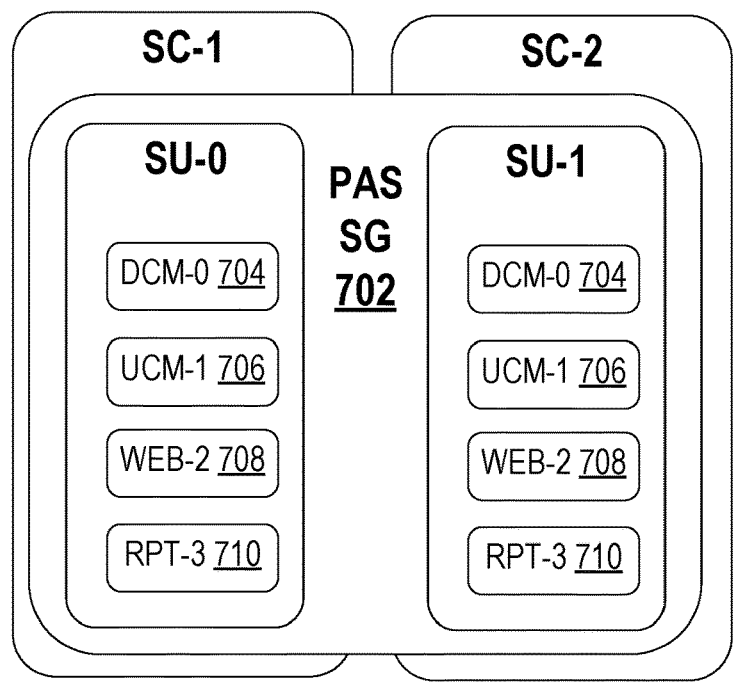
FIG. 7 is a block diagram illustrating a PAS/Report/Web Service Group Cluster configuration according to some embodiments.

FIG. 7 is a block diagram illustrating a PAS/Report/Web Service Group Cluster Configuration 700. In an embodiment, a PAS Service Group 702 consists of components including a (DCM) component 704, a Use Case Manager (UCM) component 706, a web server 708, and a report generator 710.

In an embodiment, a DCM 704 schedules data collection jobs for use cases, which are sent to Data Collection Agents (DCA) component on DCS Service Group (SG), actively monitors all data collection jobs and selects least loaded DCS to schedule new jobs, and receives success, failure, and error notifications from DCA, which is used to reschedule failed jobs.

In an embodiment, a Use Case Manager (UCM) component 706 manages CRUD operations, and monitors execution and maintains history.

In an embodiment, a report generator 710 generates various reports for the use cases, such as emails, spreadsheets. etc.

Figure 8A:
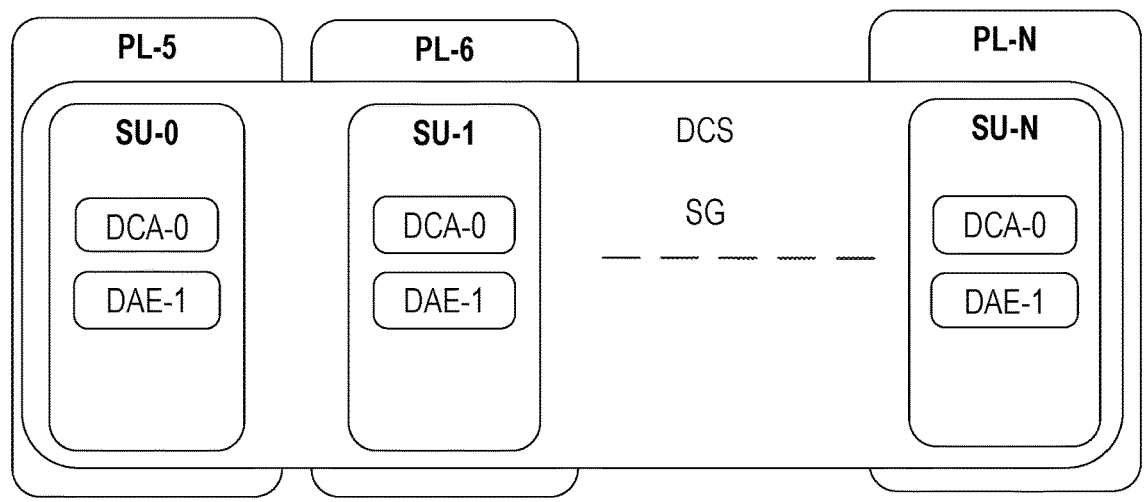
FIGS. 8A-8C are block diagrams illustrating a data collection server (DCS) service group cluster configuration, a database service group cluster configuration, and an ELK service group cluster configuration, respectively, according to some embodiments.
Figure 8B:
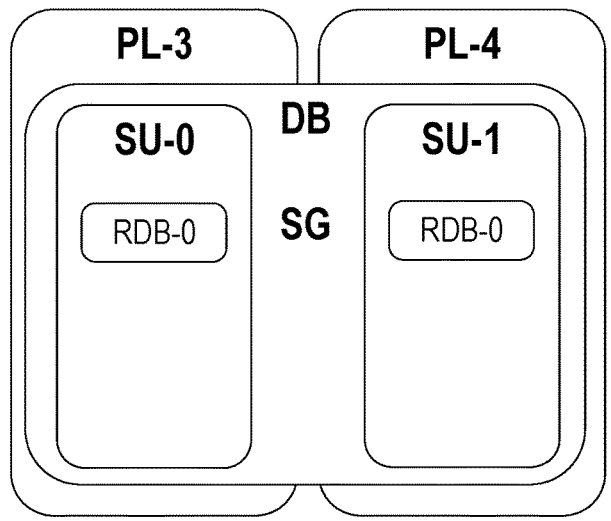
Figure 8C:
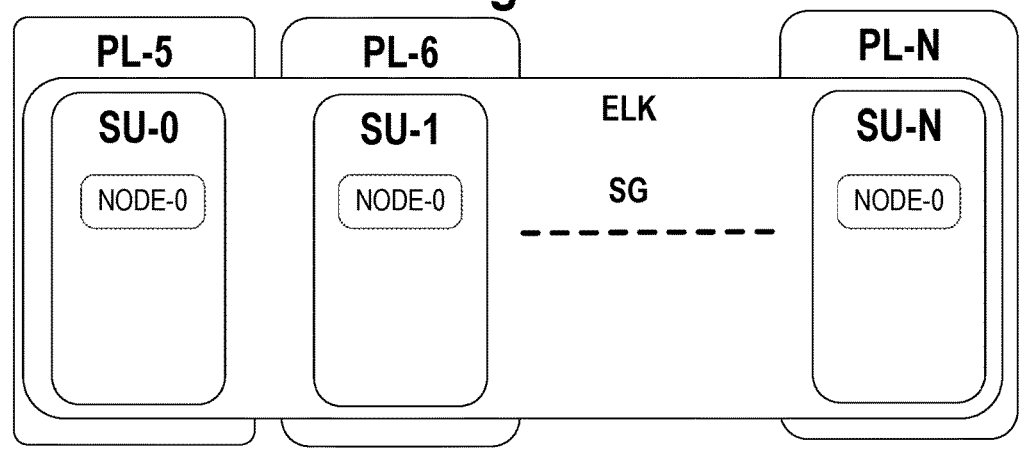
Figure 9:
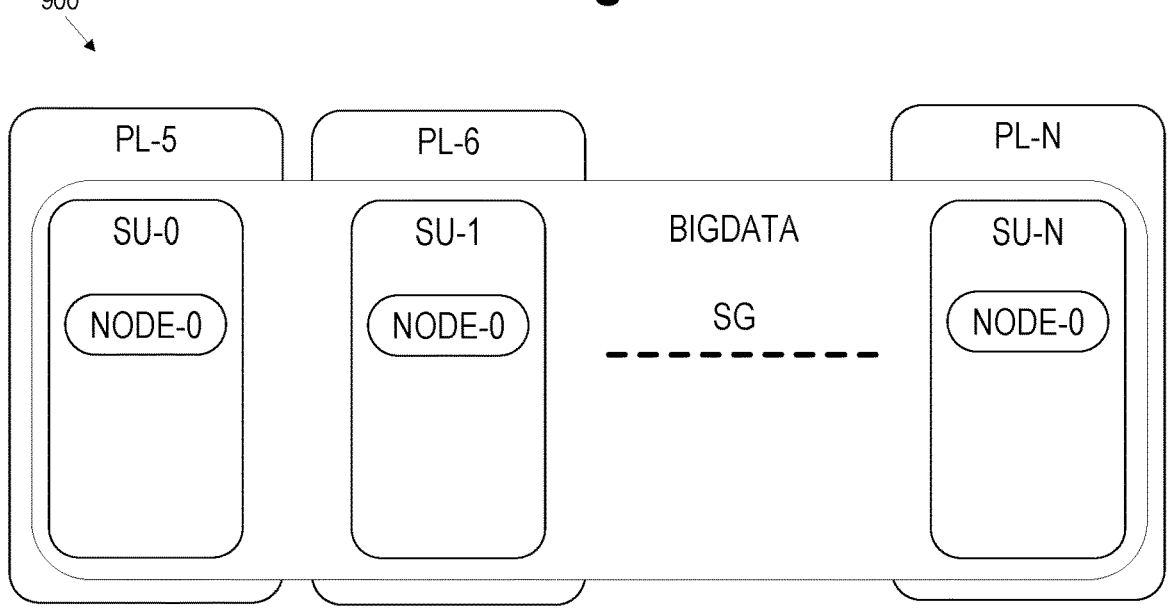
FIG. 9 is a block diagram illustrating a big data service group cluster configuration according to some embodiments.

FIG. 8A is a block diagram illustrating a DCS service group cluster configuration 800A. FIG. 8B is a database service group cluster configuration 800B. FIG. 8C is an ELK service group cluster configuration 800C. FIG. 9 is a block diagram illustrating a big data service group cluster configuration 900.

In an embodiment, a DCS service group consists of a Data Collection Agent (DCA) component and a Data Analysis Engine (DAE) component. In an embodiment, a (DCA) component receives data collection jobs for DCA, starts data collection threads for requested nodes, and sends success, failure, and error notifications to DCM. In an embodiment, a (DAE) component is invoked by DCA to process data, parses data collected by DCA threads, co-relates and performs analytics on collected data, and stores analyzed information in database.

4.0 VPAS Software Architecture

Figure 10:
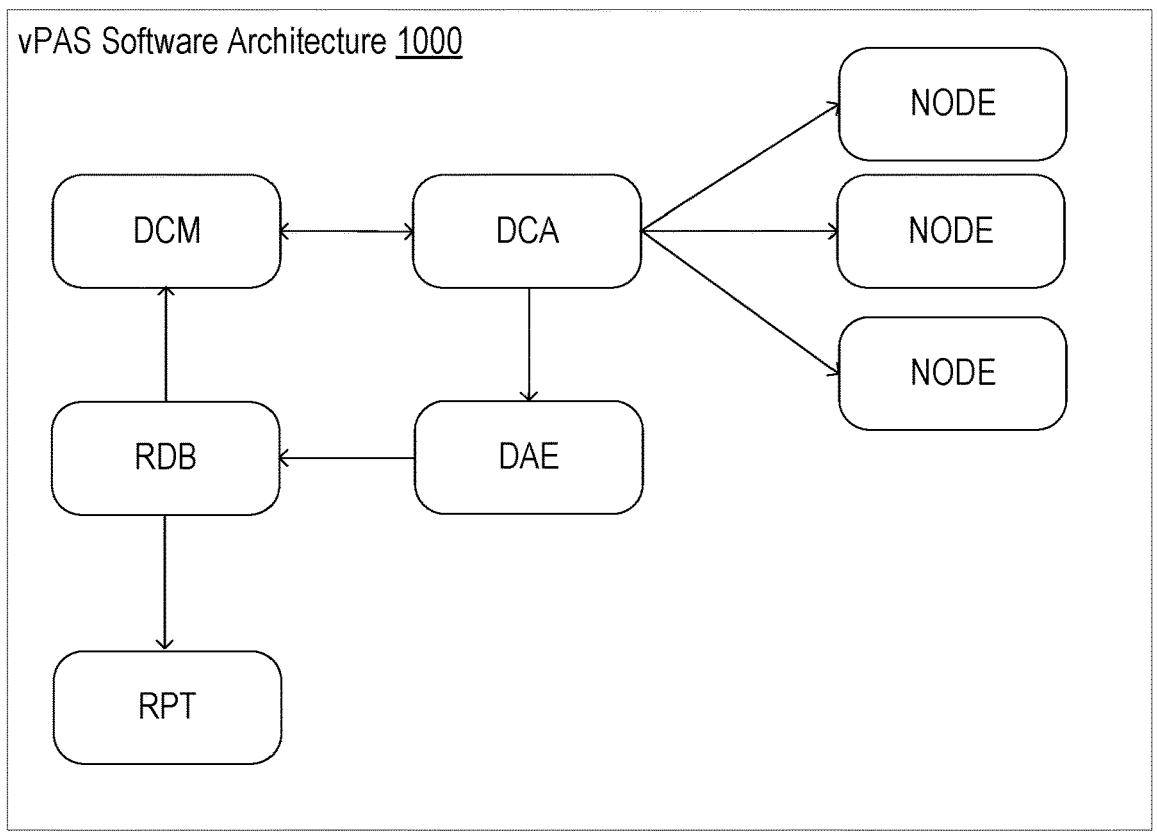
FIG. 10 is a block diagram illustrating components of a vPAS software architecture and work flow between components according to some embodiments.

FIG. 10 shows the vPAS software architecture 1000 and work flow between each component.

5.0 User Interface

Figure 11:
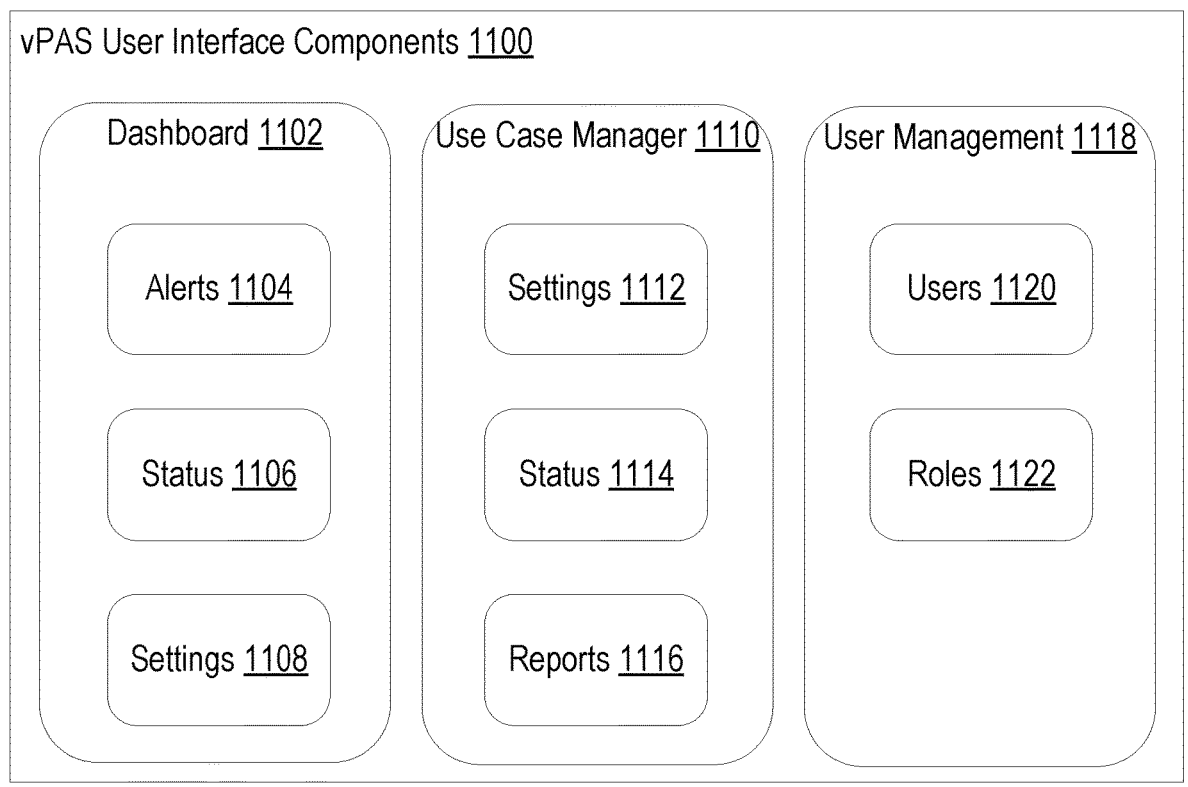
FIG. 11 is a block diagram illustrating components of a vPAS user interface according to some embodiments.

FIG. 11 shows example components of a vPAS system user interface. In an embodiment, a vPAS user interface includes a Dashboard 1102 (e.g., including display of alerts 1104, status information 1106, and settings information 1108), a Use Case Manager 1110 (e.g., including interface elements for configuring use case settings 1112, displaying status information 1114, and displaying reports 1116), and a User Management Module 1118 (e.g., including interface elements for adding/removing/modifying users 1120, and configuring user roles 1122).

6.0 Use Case Configuration

In an embodiment, use case configuration involves collection, parsing, analysis, and reporting. In an embodiment, use case collection configuration includes node information, command list to execute, schedule and timeout period, and error handling. In an embodiment, use case parsing configuration includes node information, and command output to parse. In an embodiment, use case analysis configuration includes formulae to calculate result (example: KPI), and correlation configuration. In an embodiment, use case reporting configuration includes results to report, report format, report method/medium, and a distribution list.

7.0 Use Case Package Delivery

In an embodiment, a vPAS implement includes functionality for delivering use case packages. Use case package delivery includes a use case configuration file, a list of software modules (and versions) required to execute use case, a license key, and default users and roles.

8.0 VPAS Operation and Management

In an embodiment, operation and management of a vPAS system includes software deployment (including software installation, upgrade, backup and recovery), system deployment (including cluster image generation, cluster orchestration, and cluster monitoring and integrity), license management, fault management (including alarms and alerts, and logs and traces), performance management, and security management (including certificate management, security crypto, local authentication management, user authentication and authorization, and software encryption)

8.0 Abbreviations

| | |
|---|---|
| AMF | Application Management Framework |
| CBA | Component Based Architecture |
| DAE | Data Analytics Engine |
| DB | Database |
| DCA | Data Collection Agents |
| DCM | Data Collection Manager |
| DCS | Data Collection Server |
| DRBD | Distributed Replicated Block Device |
| LDE | Linux Distribution Extensions |
| MME | Mobility Management Entity |
| NFV | Network Function Virtualization |
| PAS | Proactive Service |
| PL | Payload |
| RDB | Relational Database |
| RPT | Report Generator |
| SAF | Service Availability Framework |
| SC | System Controller |
| SG | Service Group |
| SMF | Software Management Framework |
| SU | Service Unit |
| UCM | Use Case Manager |
| VM | Virtual Machine |
| vPAS | Virtualized Proactive Service |
| WEB | Web Server |

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 12A:
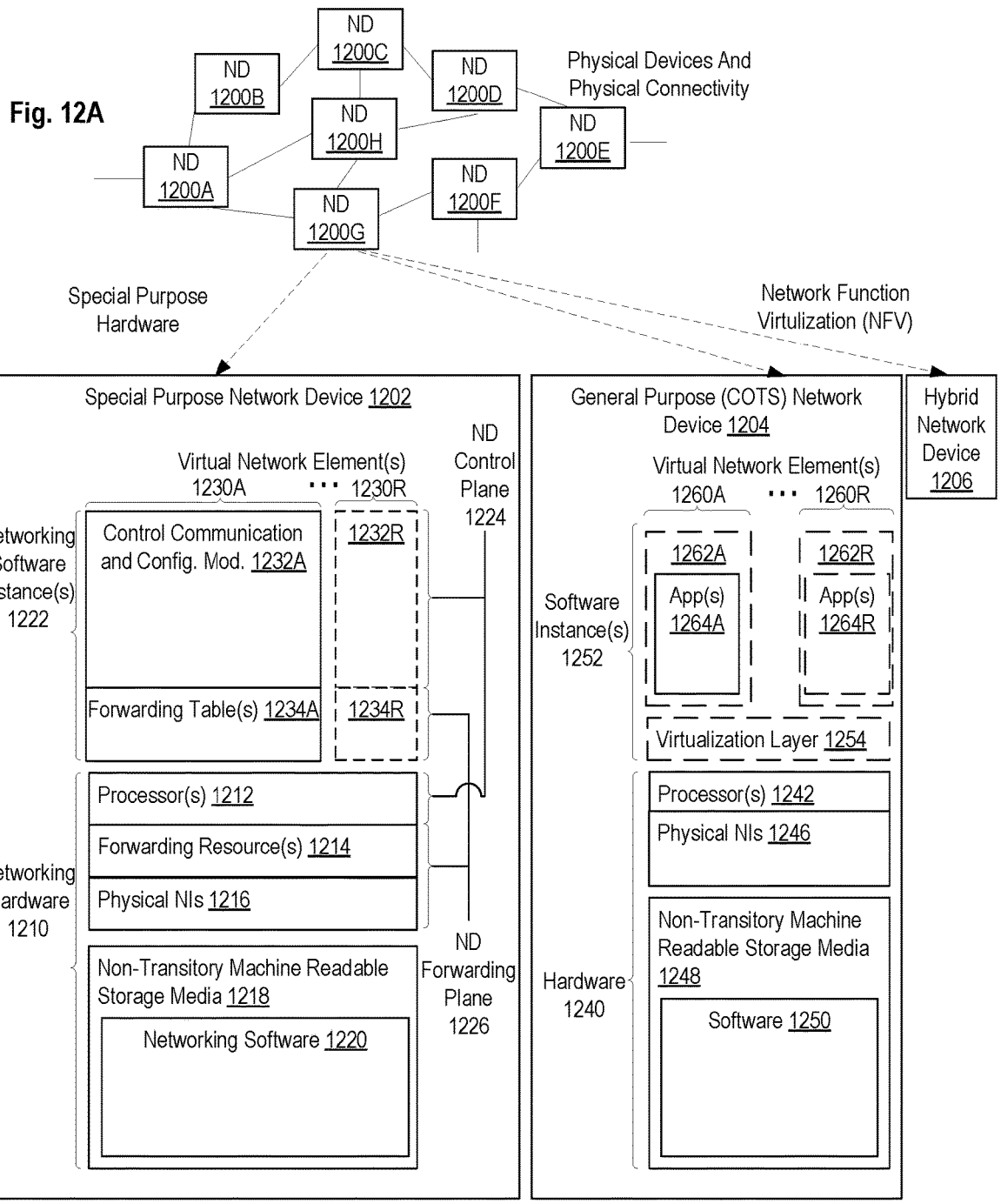
FIG. 12A illustrates connectivity between network devices (NDs) within an exemplary network, as well as three exemplary implementations of the NDs, according to some embodiments of the invention.

FIG. 12A illustrates connectivity between network devices (NDs) within an exemplary network, as well as three exemplary implementations of the NDs, according to some embodiments of the invention. FIG. 12A shows NDs 1200A-H, and their connectivity by way of lines between 1200A-1200B, 1200B-1200C, 1200C-1200D, 1200D-1200E, 1200E-1200F, 1200F-1200G, and 1200A-1200G, as well as between 1200H and each of 1200A, 1200C, 1200D, and 1200G. These NDs are physical devices, and the connectivity between these NDs can be wireless or wired (often referred to as a link). An additional line extending from NDs 1200A, 1200E, and 1200F illustrates that these NDs act as ingress and egress points for the network (and thus, these NDs are sometimes referred to as edge NDs; while the other NDs may be called core NDs).

Two of the exemplary ND implementations in FIG. 12A are: 1) a special-purpose network device 1202 that uses custom application—specific integrated—circuits (ASICs) and a special-purpose operating system (OS); and 2) a general purpose network device 1204 that uses common off-the-shelf (COTS) processors and a standard OS.

The special-purpose network device 1202 includes networking hardware 1210 comprising a set of one or more processor(s) 1212, forwarding resource(s) 1214 (which typically include one or more ASICs and/or network processors), and physical network interfaces (NIs) 1216 (through which network connections are made, such as those shown by the connectivity between NDs 1200A-H), as well as non-transitory machine readable storage media 1218 having stored therein networking software 1220. During operation, the networking software 1220 may be executed by the networking hardware 1210 to instantiate a set of one or more networking software instance(s) 1222. Each of the networking software instance(s) 1222, and that part of the networking hardware 1210 that executes that network software instance (be it hardware dedicated to that networking software instance and/or time slices of hardware temporally shared by that networking software instance with others of the networking software instance(s) 1222), form a separate virtual network element 1230A-R. Each of the virtual network element(s) (VNEs) 1230A-R includes a control communication and configuration module 1232A-R (sometimes referred to as a local control module or control communication module) and forwarding table(s) 1234A-R, such that a given virtual network element (e.g., 1230A) includes the control communication and configuration module (e.g., 1232A), a set of one or more forwarding table(s) (e.g., 1234A), and that portion of the networking hardware 1210 that executes the virtual network element (e.g., 1230A).

The special-purpose network device 1202 is often physically and/or logically considered to include: 1) a ND control plane 1224 (sometimes referred to as a control plane) comprising the processor(s) 1212 that execute the control communication and configuration module(s) 1232A-R; and 2) a ND forwarding plane 1226 (sometimes referred to as a forwarding plane, a data plane, or a media plane) comprising the forwarding resource(s) 1214 that utilize the forwarding table(s) 1234A-R and the physical NIs 1216. By way of example, where the ND is a router (or is implementing routing functionality), the ND control plane 1224 (the processor(s) 1212 executing the control communication and configuration module(s) 1232A-R) is typically responsible for participating in controlling how data (e.g., packets) is to be routed (e.g., the next hop for the data and the outgoing physical NI for that data) and storing that routing information in the forwarding table(s) 1234A-R, and the ND forwarding plane 1226 is responsible for receiving that data on the physical NIs 1216 and forwarding that data out the appropriate ones of the physical NIs 1216 based on the forwarding table(s) 1234A-R.

Figure 12B:
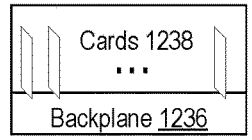
FIG. 12B illustrates an exemplary way to implement a special-purpose network device according to some embodiments of the invention.

FIG. 12B illustrates an exemplary way to implement the special-purpose network device 1202 according to some embodiments of the invention. FIG. 12B shows a special-purpose network device including cards 1238 (typically hot pluggable). While in some embodiments the cards 1238 are of two types (one or more that operate as the ND forwarding plane 1226 (sometimes called line cards), and one or more that operate to implement the ND control plane 1224 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1236 (e.g., a first full mesh coupling the line cards and a second full mesh coupling all of the cards).

Returning to FIG. 12A, the general purpose network device 1204 includes hardware 1240 comprising a set of one or more processor(s) 1242 (which are often COTS processors) and physical NIs 1246, as well as non-transitory machine readable storage media 1248 having stored therein software 1250. During operation, the processor(s) 1242 execute the software 1250 to instantiate one or more sets of one or more applications 1264A-R. While one embodiment does not implement virtualization, alternative embodiments may use different forms of virtualization. For example, in one such alternative embodiment the virtualization layer 1254 represents the kernel of an operating system (or a shim executing on a base operating system) that allows for the creation of multiple instances 1262A-R called software containers that may each be used to execute one (or more) of the sets of applications 1264A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1254 represents a hypervisor (sometimes referred to as a virtual machine monitor (VMM)) or a hypervisor executing on top of a host operating system, and each of the sets of applications 1264A-R is run on top of a guest operating system within an instance 1262A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1240, directly on a hypervisor (in which case the unikernel is sometimes described as running within a LibOS virtual machine), or in a software container, embodiments can be implemented fully with unikernels running directly on a hypervisor represented by virtualization layer 1254, unikernels running within software containers represented by instances 1262A-R, or as a combination of unikernels and the above-described techniques (e.g., unikernels and virtual machines both run directly on a hypervisor, unikernels and sets of applications that are run in different software containers).

The instantiation of the one or more sets of one or more applications 1264A-R, as well as virtualization if implemented, are collectively referred to as software instance(s) 1252. Each set of applications 1264A-R, corresponding virtualization construct (e.g., instance 1262A-R) if implemented, and that part of the hardware 1240 that executes them (be it hardware dedicated to that execution and/or time slices of hardware temporally shared), forms a separate virtual network element(s) 1260A-R.

The virtual network element(s) 1260A-R perform similar functionality to the virtual network element(s) 1230A-R—e.g., similar to the control communication and configuration module(s) 1232A and forwarding table(s) 1234A (this virtualization of the hardware 1240 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1262A-R corresponding to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1262A-R to VNEs also apply to embodiments where such a finer level of granularity and/or unikernels are used.

In certain embodiments, the virtualization layer 1254 includes a virtual switch that provides similar forwarding services as a physical Ethernet switch. Specifically, this virtual switch forwards traffic between instances 1262A-R and the physical NI(s) 1246, as well as optionally between the instances 1262A-R; in addition, this virtual switch may enforce network isolation between the VNEs 1260A-R that by policy are not permitted to communicate with each other (e.g., by honoring virtual local area networks (VLANs)).

The third exemplary ND implementation in FIG. 12A is a hybrid network device 1206, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1202) could provide for para-virtualization to the networking hardware present in the hybrid network device 1206.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1230A-R, VNEs 1260A-R, and those in the hybrid network device 1206) receives data on the physical NIs (e.g., 1216, 1246) and forwards that data out the appropriate ones of the physical NIs (e.g., 1216, 1246). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 12C:
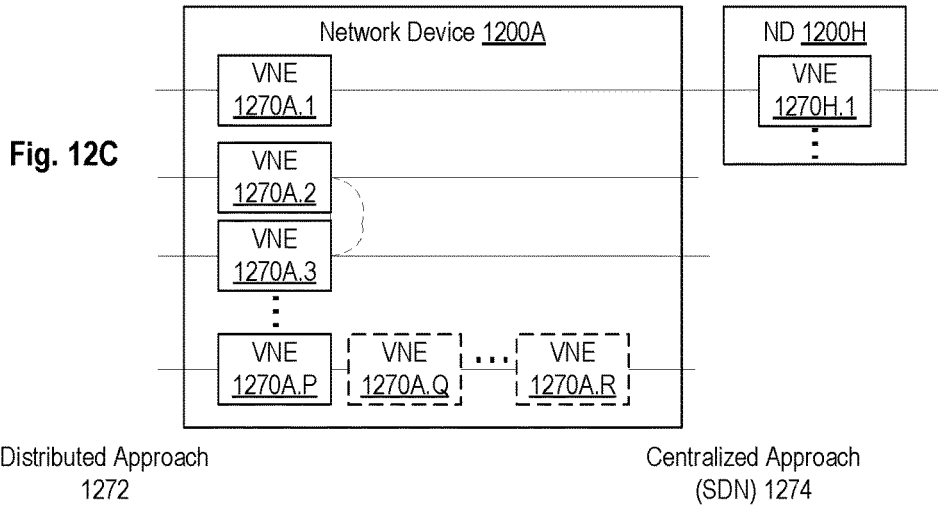
FIG. 12C illustrates various exemplary ways in which virtual network elements (VNEs) may be coupled according to some embodiments of the invention.

FIG. 12C illustrates various exemplary ways in which VNEs may be coupled according to some embodiments of the invention. FIG. 12C shows VNEs 1270A.1-1270A.P (and optionally VNEs 1270A.Q-1270A.R) implemented in ND 1200A and VNE 1270H.1 in ND 1200H. In FIG. 12C, VNEs 1270A.1-P are separate from each other in the sense that they can receive packets from outside ND 1200A and forward packets outside of ND 1200A; VNE 1270A.1 is coupled with VNE 1270H.1, and thus they communicate packets between their respective NDs; VNE 1270A.2-1270A.3 may optionally forward packets between themselves without forwarding them outside of the ND 1200A; and VNE 1270A.P may optionally be the first in a chain of VNEs that includes VNE 1270A.Q followed by VNE 1270A.R (this is sometimes referred to as dynamic service chaining, where each of the VNEs in the series of VNEs provides a different service—e.g., one or more layer 4-7 network services). While FIG. 12C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 12A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 12A may also host one or more such servers (e.g., in the case of the general purpose network device 1204, one or more of the software instances 1262A-R may operate as servers; the same would be true for the hybrid network device 1206; in the case of the special-purpose network device 1202, one or more such servers could also be run on a virtualization layer executed by the processor(s) 1212); in which case the servers are said to be co-located with the VNEs of that ND.

A virtual network is a logical abstraction of a physical network (such as that in FIG. 12A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 12D:
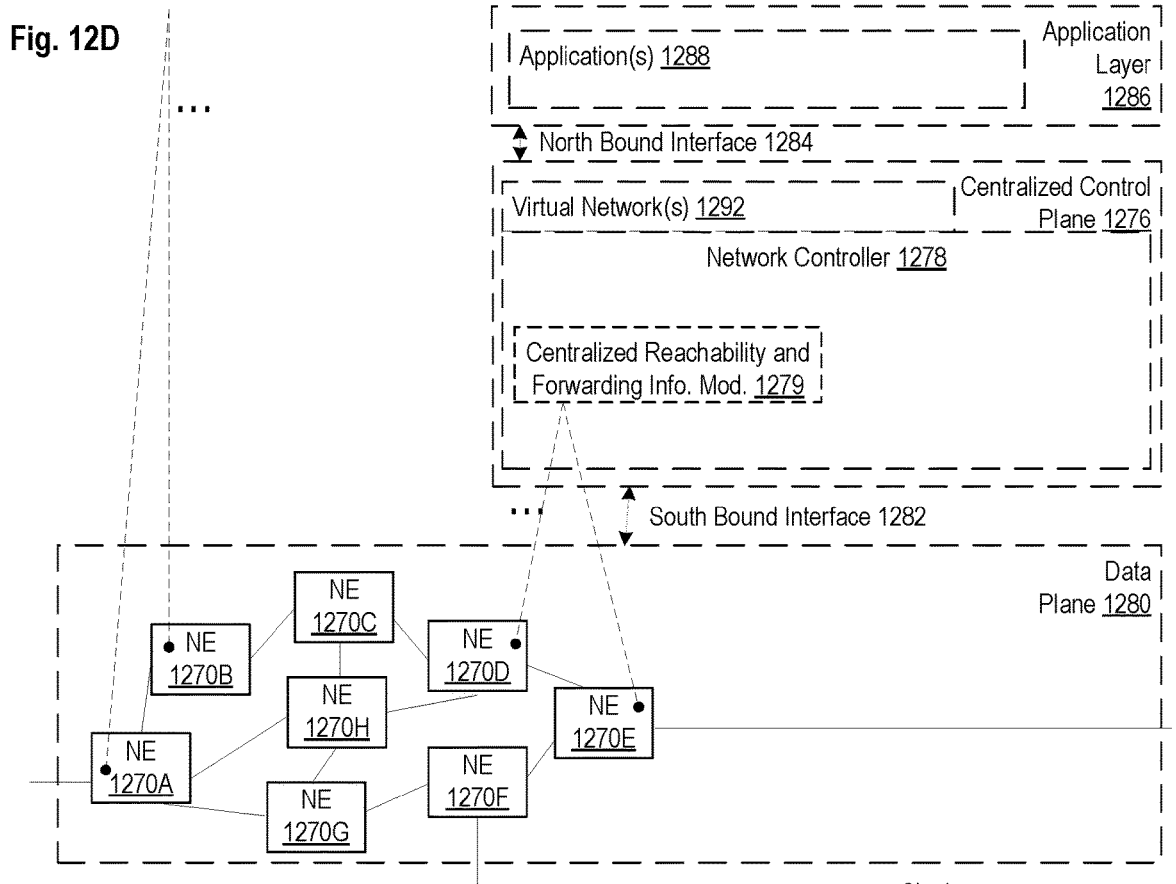
FIG. 12D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 12D illustrates a network with a single network element on each of the NDs of FIG. 12A, and within this straight forward approach contrasts a traditional distributed approach (commonly used by traditional routers) with a centralized approach for maintaining reachability and forwarding information (also called network control), according to some embodiments of the invention. Specifically, FIG. 12D illustrates network elements (NEs) 1270A-H with the same connectivity as the NDs 1200A-H of FIG. 12A.

FIG. 12D illustrates that the distributed approach 1272 distributes responsibility for generating the reachability and forwarding information across the NEs 1270A-H; in other words, the process of neighbor discovery and topology discovery is distributed.

For example, where the special-purpose network device 1202 is used, the control communication and configuration module(s) 1232A-R of the ND control plane 1224 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1270A-H (e.g., the processor(s) 1212 executing the control communication and configuration module(s) 1232A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1224. The ND control plane 1224 programs the ND forwarding plane 1226 with information (e.g., adjacency and route information) based on the routing structure(s). For example, the ND control plane 1224 programs the adjacency and route information into one or more forwarding table(s) 1234A-R (e.g., Forwarding Information Base (FIB), Label Forwarding Information Base (LFIB), and one or more adjacency structures) on the ND forwarding plane 1226. For layer 2 forwarding, the ND can store one or more bridging tables that are used to forward data based on the layer 2 information in that data. While the above example uses the special-purpose network device 1202, the same distributed approach 1272 can be implemented on the general purpose network device 1204 and the hybrid network device 1206.

FIG. 12D illustrates that a centralized approach 1274 (also known as software defined networking (SDN)) that decouples the system that makes decisions about where traffic is sent from the underlying systems that forwards traffic to the selected destination. The illustrated centralized approach 1274 has the responsibility for the generation of reachability and forwarding information in a centralized control plane 1276 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1276 has a south bound interface 1282 with a data plane 1280 (sometime referred to the infrastructure layer, network forwarding plane, or forwarding plane (which should not be confused with a ND forwarding plane)) that includes the NEs 1270A-H (sometimes referred to as switches, forwarding elements, data plane elements, or nodes). The centralized control plane 1276 includes a network controller 1278, which includes a centralized reachability and forwarding information module 1279 that determines the reachability within the network and distributes the forwarding information to the NEs 1270A-H of the data plane 1280 over the south bound interface 1282 (which may use the OpenFlow protocol). Thus, the network intelligence is centralized in the centralized control plane 1276 executing on electronic devices that are typically separate from the NDs.

For example, where the special-purpose network device 1202 is used in the data plane 1280, each of the control communication and configuration module(s) 1232A-R of the ND control plane 1224 typically include a control agent that provides the VNE side of the south bound interface 1282. In this case, the ND control plane 1224 (the processor(s) 1212 executing the control communication and configuration module(s) 1232A-R) performs its responsibility for participating in controlling how data (e.g., packets) is to be routed (e.g., the next hop for the data and the outgoing physical NI for that data) through the control agent communicating with the centralized control plane 1276 to receive the forwarding information (and in some cases, the reachability information) from the centralized reachability and forwarding information module 1279 (it should be understood that in some embodiments of the invention, the control communication and configuration module(s) 1232A-R, in addition to communicating with the centralized control plane 1276, may also play some role in determining reachability and/or calculating forwarding information—albeit less so than in the case of a distributed approach; such embodiments are generally considered to fall under the centralized approach 1274, but may also be considered a hybrid approach).

While the above example uses the special-purpose network device 1202, the same centralized approach 1274 can be implemented with the general purpose network device 1204 (e.g., each of the VNE 1260A-R performs its responsibility for controlling how data (e.g., packets) is to be routed (e.g., the next hop for the data and the outgoing physical NI for that data) by communicating with the centralized control plane 1276 to receive the forwarding information (and in some cases, the reachability information) from the centralized reachability and forwarding information module 1279; it should be understood that in some embodiments of the invention, the VNEs 1260A-R, in addition to communicating with the centralized control plane 1276, may also play some role in determining reachability and/or calculating forwarding information—albeit less so than in the case of a distributed approach) and the hybrid network device 1206. In fact, the use of SDN techniques can enhance the NFV techniques typically used in the general purpose network device 1204 or hybrid network device 1206 implementations as NFV is able to support SDN by providing an infrastructure upon which the SDN software can be run, and NFV and SDN both aim to make use of commodity server hardware and physical switches.

FIG. 12D also shows that the centralized control plane 1276 has a north bound interface 1284 to an application layer 1286, in which resides application(s) 1288. The centralized control plane 1276 has the ability to form virtual networks 1292 (sometimes referred to as a logical forwarding plane, network services, or overlay networks (with the NEs 1270A-H of the data plane 1280 being the underlay network)) for the application(s) 1288. Thus, the centralized control plane 1276 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 12D shows the distributed approach 1272 separate from the centralized approach 1274, the effort of network control may be distributed differently or the two combined in certain embodiments of the invention. For example: 1) embodiments may generally use the centralized approach (SDN) 1274, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1274, but may also be considered a hybrid approach.

While FIG. 12D illustrates the simple case where each of the NDs 1200A-H implements a single NE 1270A-H, it should be understood that the network control approaches described with reference to FIG. 12D also work for networks where one or more of the NDs 1200A-H implement multiple VNEs (e.g., VNEs 1230A-R, VNEs 1260A-R, those in the hybrid network device 1206). Alternatively or in addition, the network controller 1278 may also emulate the implementation of multiple VNEs in a single ND. Specifically, instead of (or in addition to) implementing multiple VNEs in a single ND, the network controller 1278 may present the implementation of a VNE/NE in a single ND as multiple VNEs in the virtual networks 1292 (all in the same one of the virtual network(s) 1292, each in different ones of the virtual network(s) 1292, or some combination). For example, the network controller 1278 may cause an ND to implement a single VNE (a NE) in the underlay network, and then logically divide up the resources of that NE within the centralized control plane 1276 to present different VNEs in the virtual network(s) 1292 (where these different VNEs in the overlay networks are sharing the resources of the single VNE/NE implementation on the ND in the underlay network).

Figure 12E:
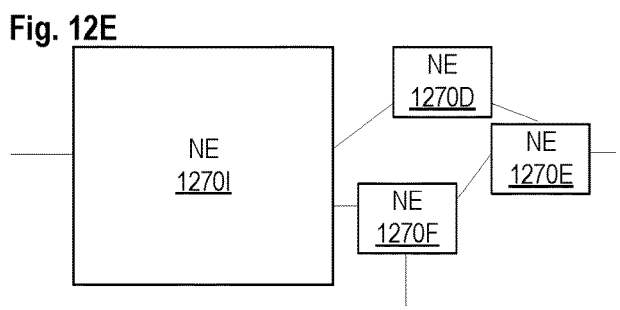
FIG. 12E illustrates the simple case of where each of the NDs implements a single NE, but a centralized control plane has abstracted multiple of the NEs in different NDs into (to represent) a single NE in one of the virtual network(s), according to some embodiments of the invention.
Figure 12F:
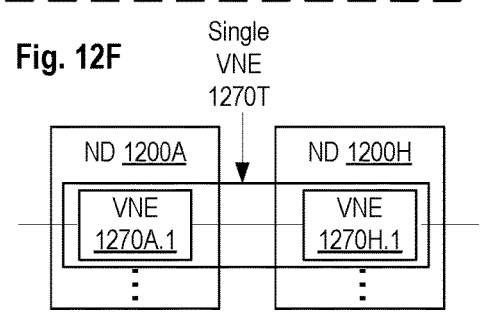
FIG. 12F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 12E and 12F respectively illustrate exemplary abstractions of NEs and VNEs that the network controller 1278 may present as part of different ones of the virtual networks 1292. FIG. 12E illustrates the simple case of where each of the NDs 1200A-H implements a single NE 1270A-H (see FIG. 12D), but the centralized control plane 1276 has abstracted multiple of the NEs in different NDs (the NEs 1270A-C and G-H) into (to represent) a single NE 1270I in one of the virtual network(s) 1292 of FIG. 12D, according to some embodiments of the invention. FIG. 12E shows that in this virtual network, the NE 1270I is coupled to NE 1270D and 1270F, which are both still coupled to NE 1270E.

FIG. 12F illustrates a case where multiple VNEs (VNE 1270A.1 and VNE 1270H.1) are implemented on different NDs (ND 1200A and ND 1200H) and are coupled to each other, and where the centralized control plane 1276 has abstracted these multiple VNEs such that they appear as a single VNE 1270T within one of the virtual networks 1292 of FIG. 12D, according to some embodiments of the invention. Thus, the abstraction of a NE or VNE can span multiple NDs.

While some embodiments of the invention implement the centralized control plane 1276 as a single entity (e.g., a single instance of software running on a single electronic device), alternative embodiments may spread the functionality across multiple entities for redundancy and/or scalability purposes (e.g., multiple instances of software running on different electronic devices).

Figure 13:
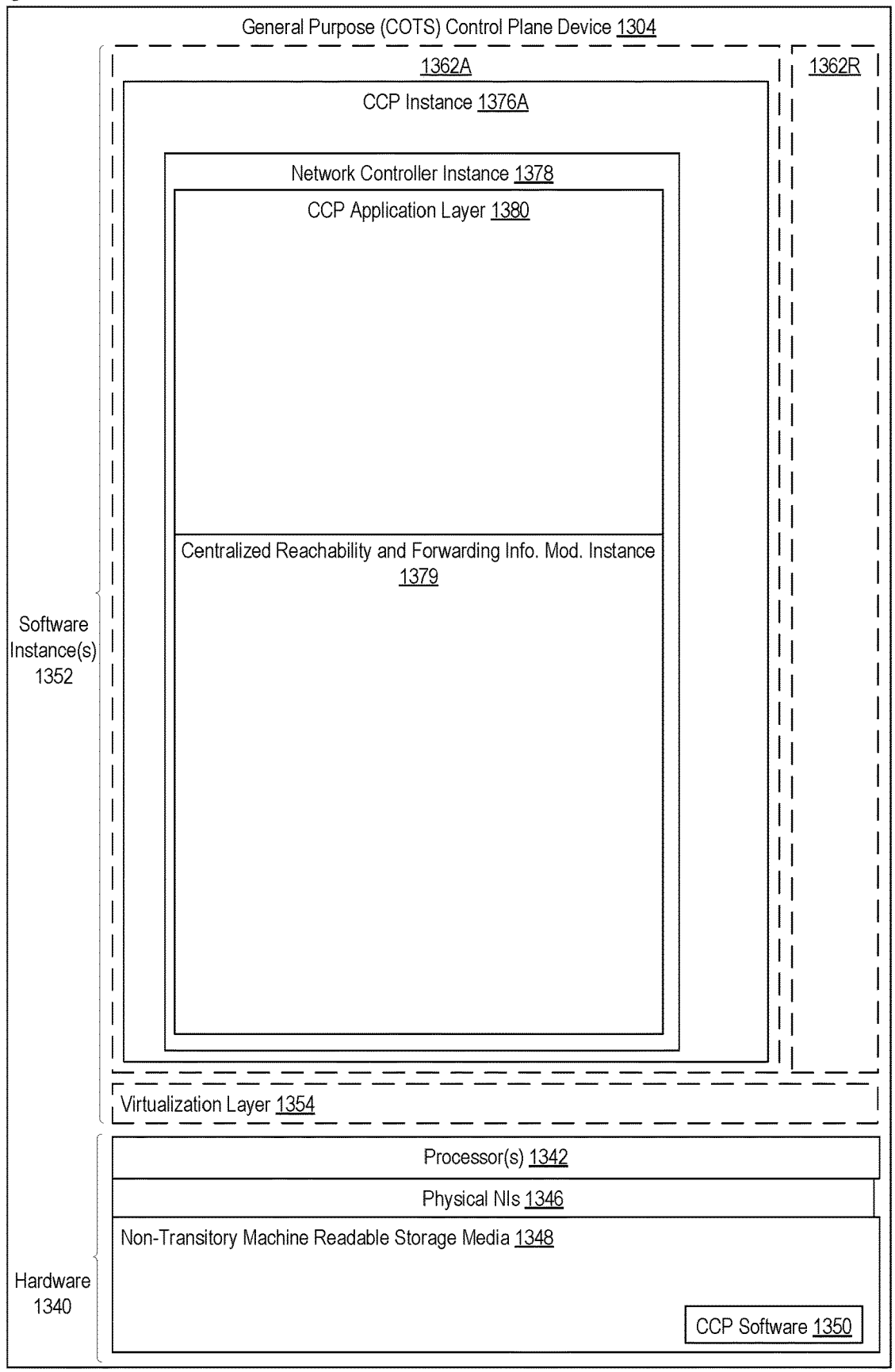
FIG. 13 illustrates a general purpose control plane device with centralized control plane (CCP) software 1350), according to some embodiments of the invention.

Similar to the network device implementations, the electronic device(s) running the centralized control plane 1276, and thus the network controller 1278 including the centralized reachability and forwarding information module 1279, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 13 illustrates, a general purpose control plane device 1304 including hardware 1340 comprising a set of one or more processor(s) 1342 (which are often COTS processors) and physical NIs 1346, as well as non-transitory machine readable storage media 1348 having stored therein centralized control plane (CCP) software 1350.

In embodiments that use compute virtualization, the processor(s) 1342 typically execute software to instantiate a virtualization layer 1354 (e.g., in one embodiment the virtualization layer 1354 represents the kernel of an operating system (or a shim executing on a base operating system) that allows for the creation of multiple instances 1362A-R called software containers (representing separate user spaces and also called virtualization engines, virtual private servers, or jails) that may each be used to execute a set of one or more applications; in another embodiment the virtualization layer 1354 represents a hypervisor (sometimes referred to as a virtual machine monitor (VMM)) or a hypervisor executing on top of a host operating system, and an application is run on top of a guest operating system within an instance 1362A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1340, directly on a hypervisor represented by virtualization layer 1354 (in which case the unikernel is sometimes described as running within a LibOS virtual machine), or in a software container represented by one of instances 1362A-R). Again, in embodiments where compute virtualization is used, during operation an instance of the CCP software 1350 (illustrated as CCP instance 1376A) is executed (e.g., within the instance 1362A) on the virtualization layer 1354. In embodiments where compute virtualization is not used, the CCP instance 1376A is executed, as a unikernel or on top of a host operating system, on the "bare metal" general purpose control plane device 1304. The instantiation of the CCP instance 1376A, as well as the virtualization layer 1354 and instances 1362A-R if implemented, are collectively referred to as software instance(s) 1352.

In some embodiments, the CCP instance 1376A includes a network controller instance 1378. The network controller instance 1378 includes a centralized reachability and forwarding information module instance 1379 (which is a middleware layer providing the context of the network controller 1278 to the operating system and communicating with the various NEs), and an CCP application layer 1380 (sometimes referred to as an application layer) over the middleware layer (providing the intelligence required for various network operations such as protocols, network situational awareness, and user—interfaces). At a more abstract level, this CCP application layer 1380 within the centralized control plane 1276 works with virtual network view(s) (logical view(s) of the network) and the middleware layer provides the conversion from the virtual networks to the physical view.

The centralized control plane 1276 transmits relevant messages to the data plane 1280 based on CCP application layer 1380 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 1280 may receive different messages, and thus different forwarding information. The data plane 1280 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1280, the packet (or a subset of the packet header and content) is typically forwarded to the centralized control plane 1276. The centralized control plane 1276 will then program forwarding table entries into the data plane 1280 to accommodate packets belonging to the flow of the unknown packet. Once a specific forwarding table entry has been programmed into the data plane 1280 by the centralized control plane 1276, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

Figure 14:
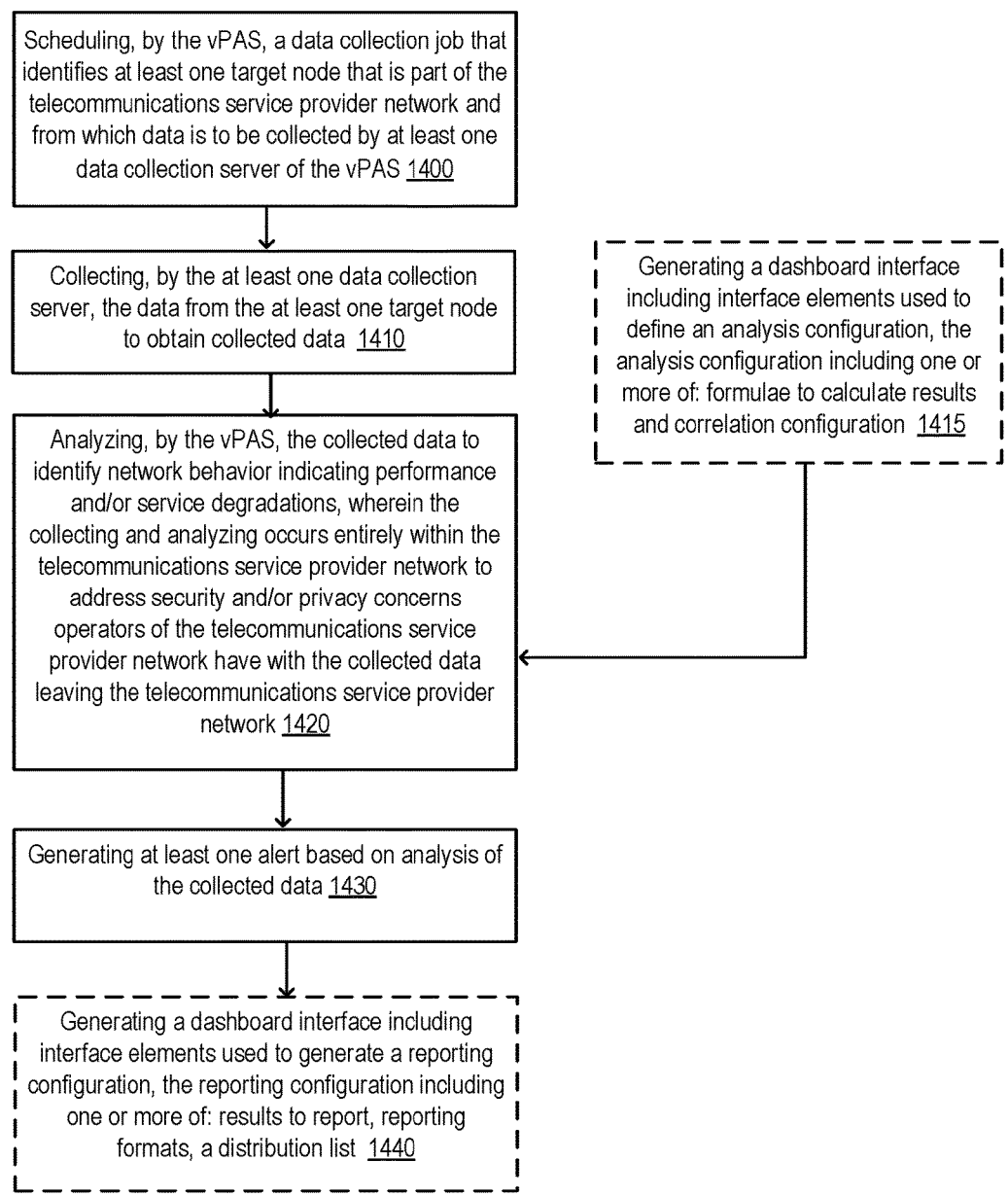
FIG. 14 is a flow diagram illustrating to a process to perform collection and analysis of data generated by target nodes within a telecommunications service provider network according to some embodiments of the invention.

FIG. 14 is a flow diagram illustrating a process to perform collection and analysis of data generated by target nodes within a telecommunications service provider network according to some embodiments of the invention. In some embodiments, these operations are performed by a set of one or more electronic devices that are hosting a virtualized proactive service (vPAS) and that are within a telecommunications service provider network.

In block 1400, the vPAS schedules a data collection job that identifies at least one target node that is part of the telecommunications service provider network and from which data is to be collected by at least one data collection server of the vPAS. As previously described, a DCM 704 schedules data collection jobs as in block 1400 in some embodiments. From block 1400, control flows to block 1410.

In block 1410, the at least one data collection server collects the data from the at least one target node to obtain collected data. In some embodiments, the collected data is then encrypted to obtain encrypted collected data, and that encrypted collected data is stored within the telecommunications service provider network. As previously described, data collection servers 106 collect the data from the at least one target node as in block 1410 in some embodiments. From block 1410, control flows to block 1420.

In block 1420, the vPAS analyzes the collected data to identify network behavior indicating performance and/or service degradations. The collection and analysis occurs entirely within the telecommunications service provider network to address security and/or privacy concerns operators of the telecommunications service provider network have with the collected data leaving the telecommunications service provider network. In some embodiments, the analysis of the collected data includes performing in-line predictive analysis. As previously described, a PAS 104 analyzes the collected data as in block 1420 in some embodiments. From block 1420, control flows to block 1430.

In block 1430, the vPAS generates at least one alert based on analysis of the collected data. In some embodiments, the vPAS generates a dashboard interface including indications of alerts generated based on the analysis of the collected data. As previously described, a report generator 710 generates an alert as in block 1430 in some embodiments. From block 1430, control flows to block 1440.

In block 1440, the vPAS generates a dashboard interface including interface elements used to generate a reporting configuration, where the reporting configuration including one or more of: results to report, reporting formats, a distribution list. As previously described, a PAS 104 generates a dashboard interface as in block 1440 in some embodiments. For example, a dashboard 1102 can be generated in some embodiments.

In some embodiments, as shown in block 1415, the vPAS also generates a dashboard interface including interface elements used to define an analysis configuration, wherein the analysis configuration includes one or more of: formulae to calculate results and correlation configuration. As previously described, a use case manager 1110 generates a dashboard interface as in block 1415 in some embodiments. Block 1415 can be performed at different times (e.g., before the flow begins, after the data is collected, as an action that is require prior to performing block 1420, etc.) in different embodiments.

In some embodiments, the vPAS is implemented using a component based architecture (CBA). Additionally or alternatively, in some embodiments the vPAS runs in a cloud-based computing environment. Additionally or alternatively, in some embodiments the vPAS further includes a secure gateway to the vPAS, where the secure gateway is used by personnel external to the telecommunications service provider network to monitor and configure the vPAS. Additionally or alternatively, in some embodiments the vPAS generates an administrative interface used to configure the vPAS.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a set of one or more electronic devices that are hosting a virtualized proactive service (vPAS) and that are within a telecommunications service provider network, to perform collection and analysis of data generated by target nodes within the telecommunications service provider network, the method comprising:

hosting the vPAS as a self-contained system within the telecommunications service provider network, the vPAS acquired from a vPAS provider, wherein an administrative interface to the self-contained system allows the vPAS provider access to manage the vPAS;

scheduling, by the vPAS, a data collection job that identifies at least one target node that is part of the telecommunications service provider network and from which data is to be collected by at least one data collection server of the vPAS;

collecting, by the at least one data collection server, the data from the at least one target node to obtain collected data;

analyzing, by the vPAS, the collected data to identify network behavior indicating performance, or service degradations, or both performance and degradations, wherein the collecting and analyzing occurs entirely within the telecommunications service provider network by the self-contained system to prevent the collected data from leaving a firewall of the telecommunications service provider network; and generating at least one alert based on analysis of the collected data.

2. The method of claim 1, wherein the vPAS is implemented using a component based architecture (CBA).

3. The method of claim 1, wherein the vPAS runs in a cloud-based computing environment.

4. The method of claim 1, wherein analyzing the collected data includes performing in-line predictive analysis.

5. The method of claim 1, further comprising:
encrypting the collected data to obtain encrypted collected data; and
storing the encrypted collected data within the telecommunications service provider network.

6. The method of claim 1, wherein the administrative interface provides a secure gateway to monitor and configure the vPAS.

7. The method of claim 1, further comprising generating a dashboard interface including indications of alerts generated based on the analysis of the collected data.

8. The method of claim 1, further comprising generating a dashboard interface including interface elements used to define an analysis configuration, the analysis configuration including one or more of: formulae to calculate results and correlation configuration.

9. The method of claim 1, further comprising generating a dashboard interface including interface elements used to generate a reporting configuration, the reporting configuration including one or more of: results to report, reporting formats, a distribution list.

10. A non-transitory computer readable storage medium storing instructions which, when executed by at least one electronic device, cause the at least one electronic device to host a virtualized proactive service (vPAS) within a telecommunications service provider network, wherein the vPAS performs operations to collect and analyze data generated by target nodes within the telecommunications service provider network, wherein the operations comprising:
hosting the vPAS as a self-contained system within the telecommunications service provider network, the vPAS acquired from a vPAS provider, wherein an administrative interface to the self-contained system allows the vPAS provider access to manage the vPAS;
scheduling, by the vPAS, a data collection job that identifies at least one target node that is part of the telecommunications service provider network and from which data is to be collected by at least one data collection server of the vPAS;
collecting, by the at least one data collection server, the data from the at least one target node to obtain collected data;
analyzing, by the vPAS, the collected data to identify network behavior indicating performance, or service degradations, or both performance and degradations, wherein the collecting and analyzing occurs entirely within the telecommunications service provider network by the self-contained system to prevent the collected data from leaving a firewall of the telecommunications service provider network; and
generating at least one alert based on analysis of the collected data.

11. The non-transitory computer readable storage medium of claim 10, wherein the vPAS is implemented using a component based architecture (CBA).

12. The non-transitory computer readable storage medium of claim 10, wherein the vPAS runs in a cloud-based computing environment.

13. The non-transitory computer readable storage medium of claim 10, wherein analyzing the collected data includes performing in-line predictive analysis.

14. The non-transitory computer readable storage medium of claim 10, wherein the operations further comprise:
encrypting the collected data to obtain encrypted collected data; and
storing the encrypted collected data within the telecommunications network.

15. The non-transitory computer readable storage medium of claim 10, wherein the administrative interface provides a secure gateway to monitor and configure the vPAS.

16. The non-transitory computer readable storage medium of claim 10, wherein the operations further comprise generating a dashboard interface including indications of alerts generated based on the analysis of the collected data.

17. The non-transitory computer readable storage medium of claim 10, wherein the operations further comprise generating a dashboard interface including interface elements used to generate an analysis configuration, the analysis configuration including one or more of: formulae to calculate results and correlation configuration.

18. The non-transitory computer readable storage medium of claim 10, wherein the operations further comprise generating a dashboard interface including interface elements used to generate a reporting configuration, the reporting configuration including one or more of: results to report, reporting formats, a distribution list.

* * * * *